United States Patent
Ohshima (10) Patent No.: US 11,641,676 B2
(45) Date of Patent: May 2, 2023

(54) COMMUNICATION APPARATUS, CONTROL METHOD THEREOF, AND NON-TRANSITORY COMPUTER-READABLE MEDIUM

(71) Applicant: CANON KABUSHIKI KAISHA, Tokyo (JP)

(72) Inventor: Hideaki Ohshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 17/103,271

(22) Filed: Nov. 24, 2020

(65) Prior Publication Data

US 2021/0160935 A1 May 27, 2021

(30) Foreign Application Priority Data

Nov. 27, 2019 (JP) .............................. JP2019-214507

(51) Int. Cl.
*H04W 76/10* (2018.01)
*H04W 12/02* (2009.01)
(Continued)

(52) U.S. Cl.
CPC ........... *H04W 76/10* (2018.02); *H04W 12/02* (2013.01); *H04W 40/22* (2013.01); *H04W 48/16* (2013.01)

(58) Field of Classification Search
CPC ..... H04W 84/12; H04W 48/16; H04W 88/08; H04W 76/11; H04W 28/06; H04W 48/20; H04W 48/08; H04W 12/08; H04W 48/14; H04W 4/80; H04W 12/73; H04W 76/10; H04W 76/14; H04W 24/02; H04W 48/10; H04W 24/04; H04W 88/12; H04W 12/02; H04W 40/22; H04W 12/50; H04W 48/12
See application file for complete search history.

(56) References Cited

U.S. PATENT DOCUMENTS

2005/0195781 A1* 9/2005 Ikeda .................... H04W 48/12
                                                                          370/352
2008/0014934 A1* 1/2008 Balasubramanian ........................
                                                                          H04W 84/12
                                                                          455/437

(Continued)

FOREIGN PATENT DOCUMENTS

EP          1928125 A1    6/2008
EP          3562257 A1    10/2019
JP          2018-191252 A 11/2018

*Primary Examiner* — Christopher M Brandt
(74) *Attorney, Agent, or Firm* — Canon U.S.A., Inc. IP Division (57) ABSTRACT

A communication apparatus comprises a wireless communication unit, a recording unit, and a control unit. The control unit, in a case where connection with a relay apparatus is established by the wireless communication unit, controls the recording unit to record information on a network formed by the relay apparatus and information on whether a stealth mode is enabled for the network. The control unit, in a case where a beacon, which does not include an identifier of a network, is received by the wireless communication unit in a state where information on a network for which the stealth mode is enabled was recorded, controls the wireless communication unit to start wireless connection to the relay apparatus that forms the network for which the recorded information indicates the stealth mode is enabled.

15 Claims, 5 Drawing Sheets

(51) Int. Cl.
  *H04W 40/22* (2009.01)
  *H04W 48/16* (2009.01)

(56) References Cited

U.S. PATENT DOCUMENTS

| | | | |
|---|---|---|---|
| 2008/0259882 A1* | 10/2008 | Abdel-Kader | H04W 48/16 370/338 |
| 2009/0049519 A1 | 2/2009 | Uno | |
| 2010/0309815 A1* | 12/2010 | Yepez | H04W 48/16 370/254 |
| 2018/0042056 A1* | 2/2018 | Hosoda | G06F 3/1294 |
| 2018/0160416 A1* | 6/2018 | Mitsui | H04W 24/10 |
| 2019/0364493 A1* | 11/2019 | Yu | H04W 72/1247 |

\* cited by examiner

| | 311 | 312 | 313 | 314 | | 310 |
|---|---|---|---|---|---|---|
| MANAGEMENT NUMBER | 1 | 2 | 3 | 4 | 5 | M |
| CONNECTION ORDER | 1 | 2 | 3 | 4 | — | — |
| ESSID | NETWORK-100 | NETWORK-101 | NETWORK-102 | NETWORK-103 | — | — |
| AUTHENTICATION SYSTEM | WPA2 | WPA2 | WPA2 | WPA2 | — | — |
| ENCRYPTION TYPE | AES | AES | AES | AES | — | — |
| ENCRYPTION KEY | abcdefgh | 12345678 | networkkey | 13792468 | — | — |
| CHANNEL | 1 | 36 | 6 | 40 | — | — |
| IP ADDRESS ACQUISITION METHOD | Auto | Auto | Auto | Auto | — | — |
| DNS ACQUISITION METHOD | Auto | Auto | Auto | Auto | — | — |
| STEALTH MODE | YES | NO | NO | YES | — | — |

| | 321 | 322 | | | | 320 |
|---|---|---|---|---|---|---|
| MANAGEMENT NUMBER | 1 | 2 | 3 | 4 | 5 | N |
| ESSID | CAMERA-123 | CAMERA-345 | — | — | — | — |
| ENCRYPTION KEY | 12345678 | 87654321 | — | — | — | — |

| | 331 | 332 | 333 | 334 | 335 | 330 |
|---|---|---|---|---|---|---|
| MANAGEMENT NUMBER | 1 | 2 | 3 | 4 | 5 | N |
| CONNECTION ORDER | 1 | 2 | 3 | 4 | 5 | — |
| APPARATUS TYPE | MOBILE PHONE | MOBILE PHONE | PC | FTP | PC | — |
| REGISTRATION NAME | mobilePhone1 | mobilePhone2 | PC1 | FTP1 | PC2 | — |
| UUID | 0000-ABCD-EFGH | 0000-1234-5678 | 0011-AAAA-BBBB | — | 0011-BBBB-9999 | — |
| FTP SERVER ADDRESS | — | — | — | 192.168.1.2 | — | — |
| FTP LOGIN NAME | — | — | — | anonymous | — | — |
| FTP PASSWORD | — | — | — | 0000 | — | — |
| OVERWRITING OF FILE | — | — | — | YES | — | — |
| NETWORK FORMATION PARAMETER NUMBER | — | 1 | — | — | 2 | — |

FIG.4

COMMUNICATION APPARATUS, CONTROL METHOD THEREOF, AND NON-TRANSITORY COMPUTER-READABLE MEDIUM

BACKGROUND

Technical Field

The present invention relates to a communication apparatus, a control method thereof, and a non-transitory computer-readable medium. More specifically, the present invention relates to a communication apparatus that performs wireless communication, a control method thereof, and a non-transitory computer-readable medium.

Description of the Related Art

A communication apparatus such as a personal computer (PC), a digital camera, and a smartphone can perform wireless connection with an external communication apparatus via, for example, an access point of a wireless local area network (LAN). The communication apparatus can record network information on an access point to which the communication apparatus has connected. As a result, the communication apparatus can establish connection with the access point connected in the past by using the stored information.

In some access points that form a wireless LAN, for example, an operation mode (stealth mode) in which an identifier (e.g., service set identifier (SSID)) of the access point is not included in a beacon is settable in order to improve security. To establish connection with the access point in which the stealth mode is set, it is necessary to manually specify the SSID of the access point and to transmit a connection request.

Japanese Patent Laid-Open No. 2018-191252 discusses a PC that connects to an access point in which a stealth mode is set.

In a case where the connection request is continuously transmitted to connect to the access point in which the stealth mode is set, power consumption of the communication apparatus, such as a digital camera, is increased. To establish connection with the access point for which stealth setting is enabled, if a user needs to input the SSID of the access point each time the user wirelessly connects the communication apparatus, such as a digital camera, to the access point, usability of the communication apparatus may be deteriorated.

SUMMARY

According to an aspect of the present invention, there is provided a communication apparatus comprising: a wireless communication unit; a recording unit; and a control unit, wherein, in a case where connection with a relay apparatus is established by the wireless communication unit, the control unit controls the recording unit to record information on a network formed by the relay apparatus and information on whether a stealth mode is enabled for the network, as history information, and wherein, in a case where a beacon, which does not include an identifier of a network, is received by the wireless communication unit in a state where the history information includes information on a network for which the stealth mode is enabled, which was recorded due to a connection with the network in the past, the control unit is configured to control the wireless communication unit to start wireless connection to the relay apparatus that forms the network, which is recorded in the history information, for which the stealth mode is enabled.

According to another aspect of the present invention, there is provided a method for controlling a communication apparatus, the communication apparatus including a wireless communication unit and a recording unit, the method comprising: controlling, in a case where connection with a relay apparatus is established by the wireless communication unit, the recording unit to record information on a network formed by the relay apparatus and information on whether a stealth mode is enabled for the network, as history information; and controlling, in a case where a beacon, which does not include an identifier of a network is received by the wireless communication unit in a state where the history information includes information on a network for which the stealth mode is enabled, which was recorded due to a connection with the network in the past, the wireless communication unit to start wireless connection to the relay apparatus that forms the network, which is recorded in the history information, for which the stealth mode is enabled.

According to a further aspect of the present invention, there is provided a non-transitory computer-readable medium storing a program for causing a computer to execute a method for controlling a communication apparatus, the communication apparatus including a wireless communication unit and a recording unit, the method comprising: controlling, in a case where connection with a relay apparatus is established by the wireless communication unit, the recording unit to record information on a network formed by the relay apparatus and information on whether a stealth mode is enabled for the network, as history information; and controlling, in a case where a beacon, which does not include an identifier of a network is received by the wireless communication unit in a state where the history information includes information on a network for which the stealth mode is enabled, which was recorded due to a connection with the network in the past, the wireless communication unit to start wireless connection to the relay apparatus that forms the network, which is recorded in the history information for which the stealth mode is enabled.

Further features of the present invention will become apparent from the following description of exemplary embodiments with reference to the attached drawings.

DESCRIPTION OF THE EMBODIMENTS

Exemplary embodiments of the present invention are described in detail below with reference to accompanying drawings. The exemplary embodiments described below are examples as implementation of the present invention, and may be corrected or modified as necessary depending on a configuration of an apparatus to which the present invention is applied and various kinds of conditions. Further, the exemplary embodiments can be combined, as necessary.

First Exemplary Embodiment

<Configuration of Digital Camera 100>

Figure 1A:
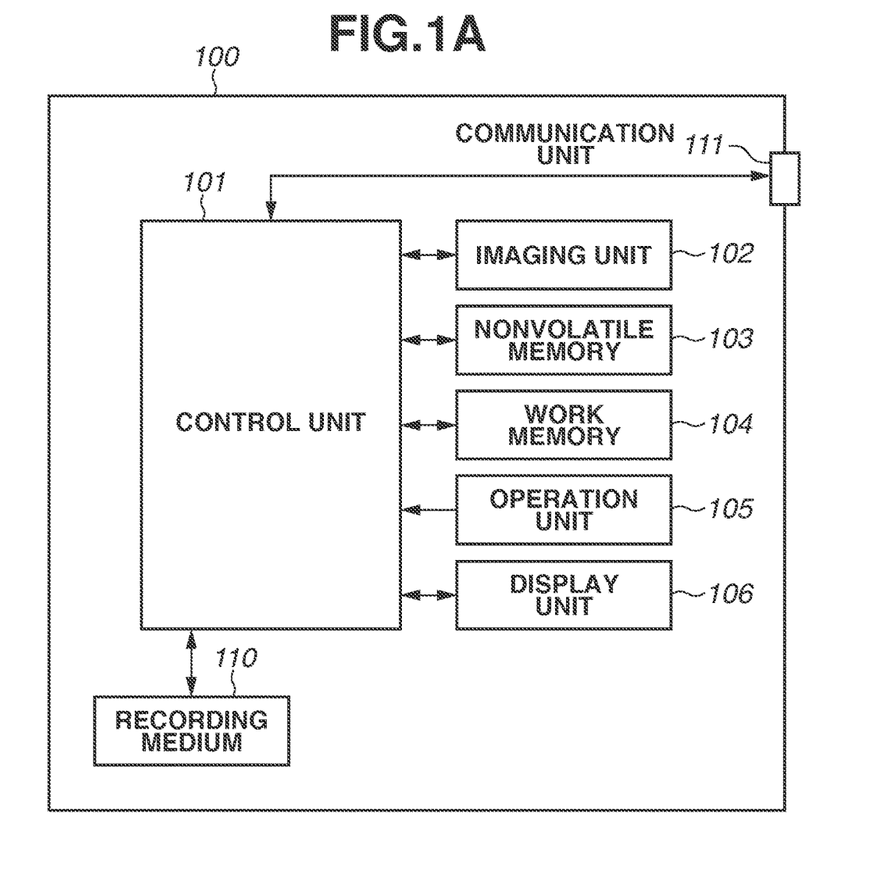
FIG. 1A is a block diagram illustrating an example of a configuration of a digital camera according to a first exemplary embodiment.

FIG. 1A is a block diagram illustrating a configuration example of a digital camera 100 as an example of a communication apparatus according to the present exemplary embodiment. Although the digital camera is described as an example of the communication apparatus in the present exemplary embodiment, the communication apparatus is not limited thereto. The communication apparatus may be, for example, a portable media player, a smartphone, a so-called tablet device, and a personal computer.

A control unit 101 controls units of the digital camera 100 based on input signals and programs described below. In place of control of the entire apparatus by the control unit 101, a plurality of pieces of hardware may share processing to control the entire apparatus.

An imaging unit 102 includes, for example, an optical lens unit, an optical system that controls a diaphragm, zoom, focus, etc., and an imaging element that converts light (image) introduced through the optical lens unit into an electric image signal. As the imaging element, a complementary metal oxide semiconductor (CMOS) imaging element and a charge coupled device (CCD) imaging element are commonly used. The imaging unit 102 converts object light formed by a lens included in the imaging unit 102 into an electric signal by the imaging element, performs noise reduction processing, and outputs digital data as image data under the control of the control unit 101. In the digital camera 100 according to the present exemplary embodiment, the image data is recorded in a recording medium 110 in accordance with standards of Design rule for Camera File system (DCF).

A nonvolatile memory 103 is an electrically erasable/writable nonvolatile memory, and stores programs (described below) to be executed by the control unit 101, etc.

A work memory 104 is used as a buffer memory that temporarily holds the image data captured by the imaging unit 102, as an image display memory of a display unit 106, and as a work area of the control unit 101.

An operation unit 105 is a user interface (UI) receiving an instruction to the digital camera 100 from a user. The operation unit 105 includes, for example, a power switch for the user to instruct the power on and off of the digital camera 100, a release switch for instructing imaging, and a reproduction button for instructing reproduction of the image data. In addition, a touch panel provided in the display unit 106 can be also included in the operation unit 105. The release switch includes a switch SW1 (not illustrated) and a switch SW2 (not illustrated). When the release switch is brought into a half-pressed state, the switch SW1 is turned on. As a result, a preparation instruction for performing preparation operation of imaging, such as automatic focus (AF) processing, automatic exposure (AE) processing, automatic white balance (AWB) processing, and flash pre-emission (EF) processing is accepted. When the release switch is brought into a full-pressed state, the switch SW2 is turned on. An imaging instruction for performing imaging operation is received through such user operation.

The display unit 106 displays a live view image in imaging, captured image data, and characters for interactive operation. The display unit 106 is, for example, a liquid crystal display or a light-emitting diode (LED) display. The display unit 106 is not necessarily incorporated in the digital camera 100, and may be externally connected with the digital camera 100. The digital camera 100 can connect with the internal or external display unit 106, and includes at least a display control function to control display of the display unit 106.

The recording medium 110 can record, for example, the image data output from the imaging unit 102. The recording medium 110 is, for example, a secure digital (SD) card or a compact flash (CF) card. The recording medium 110 may be detachably attached to the digital camera 100 or may be incorporated in the digital camera 100. In other words, the digital camera 100 includes at least a unit configured to access the recording medium 110.

A communication unit 111 is an interface for connection with an external apparatus. The digital camera 100 according to the present exemplary embodiment can exchange data with the external apparatus via the communication unit 111. For example, the digital camera 100 can transmit the image data generated by the imaging unit 102 to the external apparatus via the communication unit 111. In the present exemplary embodiment, the communication unit 111 includes an interface for performing communication with the external apparatus using a wireless LAN in accordance with standards of Institute of Electrical and Electronic Engineers (IEEE) 802.11. The control unit 101 controls the communication unit 111 to realize the wireless communication with the external apparatus.

Figure 1B:
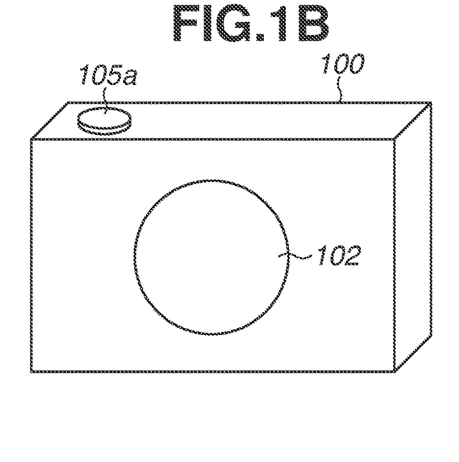
FIG. 1B is a diagram illustrating an example of front appearance of the digital camera according to the first exemplary embodiment.
Figure 1C:
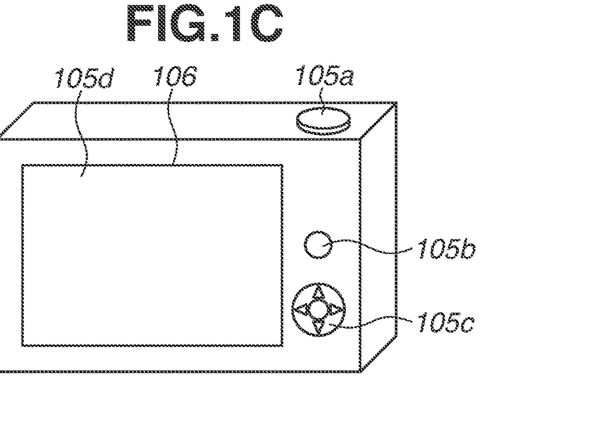
FIG. 1C is a diagram illustrating an example of rear appearance of the digital camera according to the first exemplary embodiment.

Next, an appearance of the digital camera 100 will be described. FIG. 1B is diagram illustrating an example of front appearance of the digital camera 100. FIG. 1C is a diagram illustrating an example of rear appearance of the digital camera 100. A release switch 105a, a reproduction button 105b, a direction key 105c, and a touch panel 105d are operation members included in the above-described operation unit 105. In addition, the display unit 106 displays the image obtained by imaging by the imaging unit 102, a menu screen, etc.

The example of the configuration of the digital camera 100 has been described above.

The digital camera 100 according to the present exemplary embodiment can operate as a slave apparatus in an infrastructure mode of the wireless LAN. In a case where the digital camera 100 operates as the slave apparatus, the digital camera 100 can participate in a network formed by a nearby access point (hereinafter, AP) by connecting with the AP. In a case where the digital camera 100 participates in the network, the digital camera 100 records information on the network as history information in the nonvolatile memory 103. The history information will be described below. The AP according to the present exemplary embodiment is an example of a relay apparatus.

Figure 2:
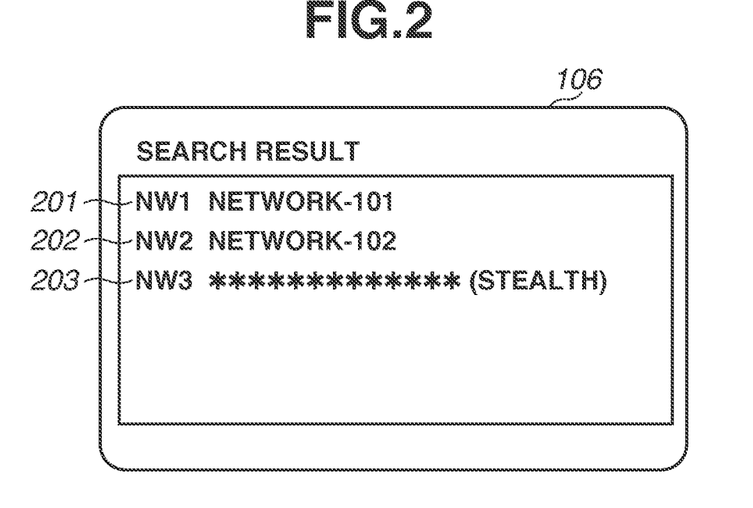
FIG. 2 illustrates an example of a screen that displays a search result of access points searched by the digital camera according to the first exemplary embodiment.

In a case where the AP forms a network, the AP switches a method of transmitting a beacon based on setting of a stealth mode. In a case where the stealth mode is disabled, the AP according to the present exemplary embodiment transmits a beacon including an extended service set identifier (ESSID) that is an identifier of the network. To search for a nearby AP, a communication apparatus such as the digital camera 100 receives a beacon transmitted from an AP for a predetermined time. In a case where the communication apparatus such as the digital camera 100 receives the beacon, the communication apparatus such as the digital camera 100 displays a parameter such as the ESSID included in the beacon to notify the user of presence of the AP near the communication apparatus. For example, in a case where the digital camera 100 according to the present exemplary embodiment searches for a nearby AP, the digital camera 100 displays a search result as illustrated in FIG. 2. In FIG. 2, the digital camera 100 displays presence of an AP that forms a network having an ESSID of "NETWORK-101", as an item 201 on the display unit 106. In FIG. 2, the digital camera 100 also displays presence of an AP that forms a network having an ESSID of "NETWORK-102", as an item 202 on the display unit 106.

In contrast, in a case where the stealth mode is enabled, the AP according to the present exemplary embodiment transmits a beacon not including the ESSID of the network. In a case where the communication apparatus such as the digital camera 100 receives the beacon, the communication apparatus cannot notify the user of presence of a specific AP because the beacon includes no ESSID. However, the communication apparatus can detect presence of the AP forming the network for which the stealth mode is enabled around the communication apparatus, by receiving the beacon. In this case, the digital camera 100 according to the present exemplary embodiment notifies the user of presence of the AP forming a network having an unknown ESSID. For example, in the case where the digital camera 100 according to the present exemplary embodiment detects the AP forming the network with the stealth mode enabled, the digital camera 100 displays a search result of AP as illustrated in an item 203 of FIG. 2. In FIG. 2, the digital camera 100 displays "*********** (stealth)" in a field for displaying an ESSID in the item 203 on the display unit 106, thereby notifying the user of presence of the AP forming the network with the stealth mode enabled. As described above, the digital camera 100 according to the present exemplary embodiment performs the display so as to allow the user to distinguish the network with the stealth mode disabled and the network with the stealth mode enabled. The digital camera 100** may perform display so as to allow the user to distinguish the network with the stealth mode disabled and the network with the stealth mode enabled by, for example, displaying a field for display of ESSID of the network with the stealth mode enabled, as a blank.

Further, the digital camera 100 according to the present exemplary embodiment can operate as an AP. In this case, the digital camera 100 according to the present exemplary embodiment operates as a simple AP that have limited functions as compared with a normal AP. In a case where the digital camera 100 operates as the simple AP, the digital camera 100 forms a network by itself. A communication apparatus around the digital camera 100 can recognize the digital camera 100 as an AP and participate in the network formed by the digital camera 100. In a case where the digital camera 100 operating as the simple AP forms the network, the digital camera 100 records information on the network as the history information in the nonvolatile memory 103 based on establishment of wireless connection with another communication apparatus. In a case where the digital camera 100 operating as the simple AP forms the network but does not establish connection with another wireless connection apparatus, the digital camera 100 does not record information on the network. In the present exemplary embodiment, a program for the digital camera 100 to operate as the simple AP is recorded in the nonvolatile memory 103.

Unlike the normal AP, the simple AP according to the present exemplary embodiment does not include a gateway function for transferring data received from a slave apparatus to an internet provider. Therefore, the digital camera 100 as the simple AP cannot transfer the data received from another communication apparatus participating in the network formed by the digital camera 100, to an external network such as the Internet.

To connect with another communication apparatus, first, the digital camera 100 participates in a network formed by an external AP, or operates as the simple AP and forms a network. Thereafter, the digital camera 100 establishes connection with the other communication apparatus through the network. In a case where the digital camera 100 establishes connection with the other communication apparatus, the digital camera 100 records connection information on the other communication apparatus with which the connection is established, as the history information in the nonvolatile memory 103.

<History Information>

Figure 3:
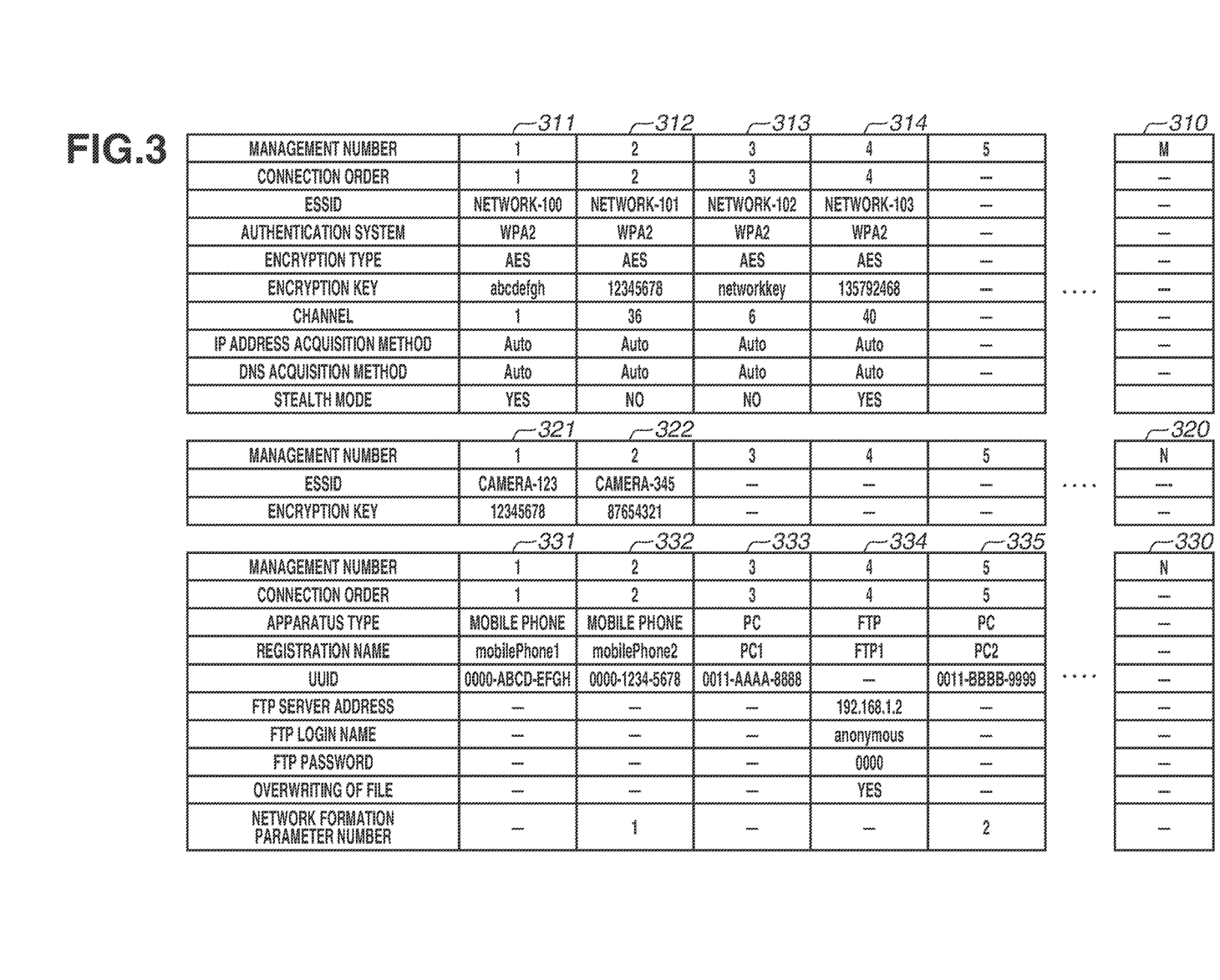
FIG. 3 illustrates an example of history information recorded in the digital camera according to the first exemplary embodiment.

The history information recorded by the digital camera 100 according to the present exemplary embodiment will be described with reference to FIG. 3. In the present exemplary embodiment, the digital camera 100 records information on a network in which the digital camera 100 has participated, information on a network formed by the digital camera 100, and connection information on another communication apparatus, as independent history information. These pieces of history information correspond to a network participation parameter 310, a network formation parameter 320, and connection apparatus information 330. These pieces of history information are recorded in the nonvolatile memory 103 of the digital camera 100. Each of the pieces of history information is described below.

The network participation parameter 310 is history information for the digital camera 100 to manage information on a network formed by an external AP. In a case where the digital camera 100 participates in the network formed by the external AP, the digital camera 100 records information on the network as the network participation parameter 310. In the network participation parameter 310, parameters such as "management number", "connection order", "ESSID", "authentication system", "encryption type", "encryption key", "channel", "internet protocol (IP) address acquisition method", "domain name system (DNS) acquisition method", and "stealth mode", are recorded.

The parameter "connection order" represents an order in which the digital camera 100 has participated in the network in the past. Further, the parameter is also a past record representing that the digital camera 100 has participated in the network in the past. In the present exemplary embodiment, in the case where the digital camera 100 participates in the network, the digital camera 100 overwrites the value of the parameter "connection order" with a value larger than the value of the parameter "connection order" of the other network. In other words, the larger value recorded in the parameter "connection order" represents the network in which the digital camera 100 has more recently participated. In the present exemplary embodiment, the digital camera 100 determines the AP forming the network having a larger value of the parameter "connection order", as the AP having higher priority for establishment of the connection.

The parameters "ESSID", "authentication method", "encryption type", "encryption key", "channel", "IP address acquisition method", and "DNS acquisition method" are used by the digital camera 100 to wirelessly connect with the AP forming the network.

The parameter "stealth mode" represents whether the stealth mode of the AP forming the network is enabled or disabled. In the present exemplary embodiment, in a case where the stealth mode of the AP is enabled, "YES" is recorded in the parameter "stealth mode". In a case where the stealth mode of the AP is disabled, "NO" is recorded in the parameter "stealth mode".

Further, in the present exemplary embodiment, the digital camera 100 can record up to M pieces of network information in the network participation parameter 310. To newly record one piece of network information in a state where the M pieces of network information are recorded in the network participation parameter 310, the digital camera 100 deletes one of the pieces of network information recorded in the network participation parameter 310. In this case, for example, the digital camera 100 deletes network information in which the value recorded in the parameter "connection order" is the smallest, and newly records network information. For another example, in this case, the digital camera 100 may receive user operation via the operation unit 105, delete network information instructed by the user, and newly record network information.

The network formation parameter 320 is history information for the digital camera 100 to manage information on a network formed by the digital camera 100 operating as the simple AP. In the case where the digital camera 100 operating as the simple AP forms a network, the digital camera 100 records information on the simple AP as the network formation parameter 320. In the network formation parameter 320, parameters such as "management number", "ESSID", and "encryption key" are recorded.

The parameters "ESSID" and "encryption key" are used by the digital camera 100 operating as the simple AP to form a network.

In the present exemplary embodiment, the digital camera 100 can record up to N pieces of network information in the network formation parameter 320.

In the present exemplary embodiment, the digital camera 100 operating as the simple AP does not record common parameters for formation of the network in the network formation parameter 320. Examples of such parameters include the authentication system, the encryption type, the channel, the IP address acquisition method, and the DNS acquisition method, and these parameters are recorded in the nonvolatile memory 103.

The connection apparatus information 330 is history information for the digital camera 100 to manage connection information on another communication apparatus to which the digital camera 100 has connected via the network. In the case where the digital camera 100 establishes connection with another communication apparatus, the digital camera 100 records the connection information on the other communication apparatus with which the connection is established, as the connection apparatus information 330. In the connection apparatus information 330, parameters "management number", "connection order", "apparatus type", "registration name", "universally unique identifier (UUID)", "file transfer protocol (FTP) server address", "FTP login name", "FTP password", "overwriting of file", "network formation parameter number", and the like are recorded.

The parameter "connection order" represents an order in which the digital camera 100 has connected with the communication apparatus in the past. The parameter is also a past record representing that the digital camera 100 has connected with the communication apparatus in the past. In the present exemplary embodiment, in the case where the digital camera 100 establishes connection with the communication apparatus, the digital camera 100 overwrites the value of the parameter "connection order" with a value larger than the value of the parameter "connection order" of the other communication apparatus. In other words, the larger value recorded in the parameter "connection order" represents the communication apparatus with which the digital camera 100 has more recently established connection.

The parameter "apparatus type" represents a classification of the communication apparatus. For example, in a case where the connected communication apparatus is a smartphone, the digital camera 100 records "mobile phone" in the parameter "apparatus type". For another example, in a case where the connected communication apparatus is a personal computer, the digital camera 100 records "PC" in the parameter "apparatus type". In a case where the connected communication apparatus is an FTP server, the digital camera 100 records "FTP" in the parameter "apparatus type".

As the parameter "registration name", a connection apparatus name of the communication apparatus with which the connection is established is recorded. The parameter "registration name" is optionally changeable by the user.

The parameter "UUID" is an identifier for unique identification of the communication apparatus.

The parameter "FTP server address" represents an address of an FTP server. The item is recorded in a case where the digital camera 100 connects with the FTP server. The address of the FTP server is, for example, an IP address. The parameters "FTP login name" and "FTP password" are respectively an identifier (ID) and a password used by the digital camera 100 to establish connection with the FTP server.

The parameter "overwriting of file" represents whether, in a case where the digital camera 100 transfers captured image data to the FTP server, the digital camera 100 overwrites the image data having the same file name recorded in the FTP server. In a case where the digital camera 100 overwrites the image data of the same file name, the digital camera 100 records "YES" in the parameter "overwriting of file". In a case where the digital camera 100 does not overwrite the image data of the same file name, the digital camera 100 records "YES" in the parameter "overwriting of file". Further in the case where the digital camera 100 does not overwrite the image data of the same file name, the digital camera 100 adds, for example, a number or an identifier, e.g., "_1", to the file name of the image data to be transferred to the FTP server, and then transfers the image data.

The parameter "network formation parameter number" is a parameter to associate the information on the network formed by the digital camera 100 with the connection apparatus information 330 in the case where another communication apparatus connects with the digital camera 100 operating as the simple AP. In the present exemplary embodiment, the digital camera 100 records a value of the parameter "management number" in the network formation parameter 320, as the parameter "network formation parameter number".

Further, in the present exemplary embodiment, the digital camera 100 can record up to N pieces of connection information on the other communication apparatuses in the connection apparatus information 330. To newly record connection information on another communication apparatus in a state where the N pieces of connection information on other communication apparatuses are recorded in the connection apparatus information 330, the digital camera 100 deletes one of the pieces of connection information on the communication apparatuses recorded in the connection apparatus information 330. For example, in this case, the digital camera 100 deletes the connection information on the communication apparatus in which the value recorded in the parameter "connection order" is the smallest, and newly records connection information on the communication apparatus. For another example, in this case, the digital camera 100 may receive user operation via the operation unit 105, delete connection information on the communication apparatus instructed by the user, and newly record connection information on the communication apparatus.

In a case where certain connection apparatus information 330 is deleted, one network formation parameter 320 may become unassociated with any "network formation parameter number". In this case, the digital camera 100 may delete the network formation parameter 320. Accordingly, the digital camera 100 does not record over N pieces of network formation parameter 320.

The digital camera 100 may record the parameters "apparatus type", "registration name", and "UUID" as one ID. In this case, for example, the digital camera 100 record the ID in which the parameters "apparatus type", "registration name", and "UUID" are linked.

<Connection Processing>

Figure 4:
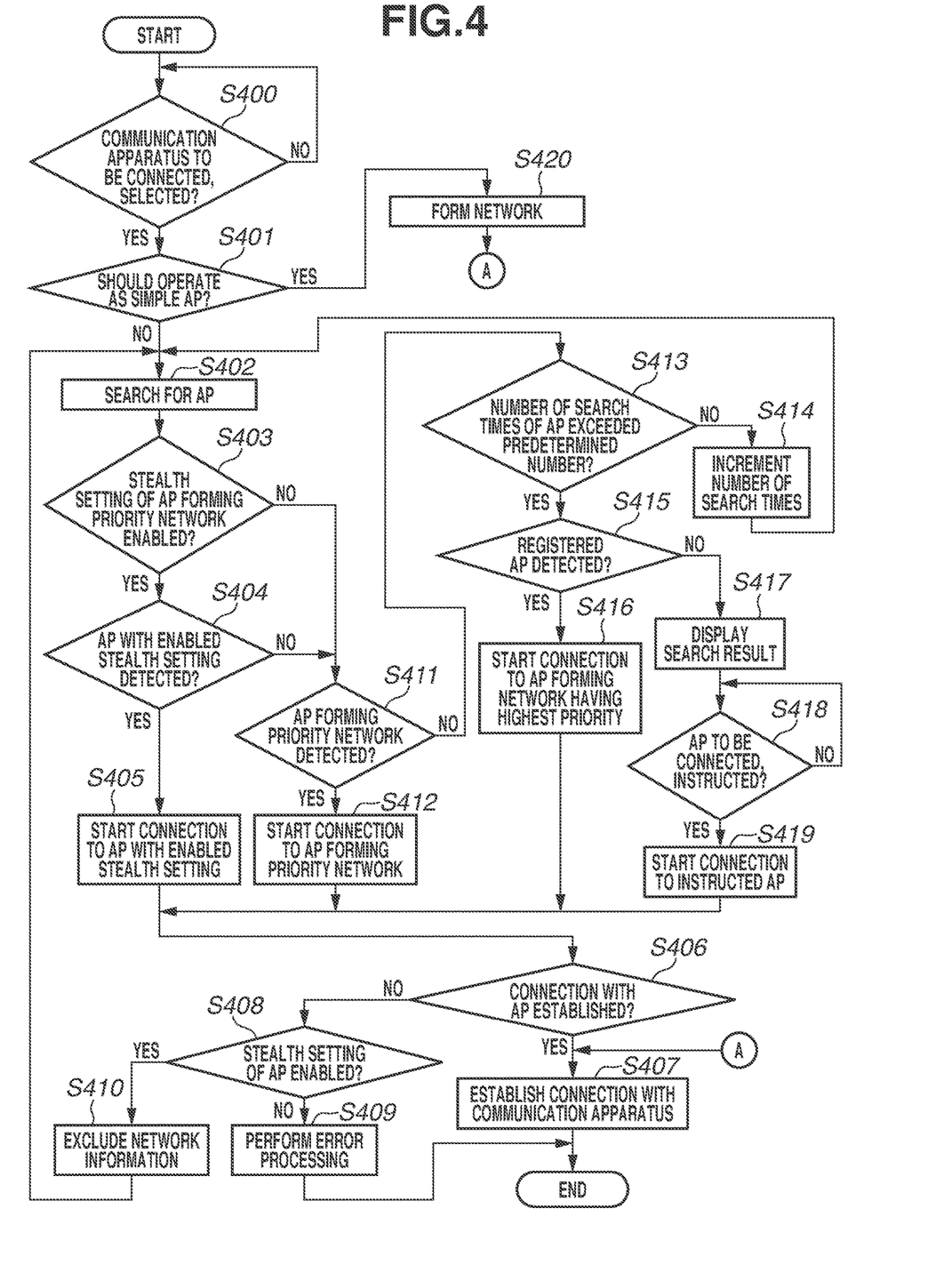
FIG. 4 illustrates an example of connection processing of the digital camera according to the first exemplary embodiment.
Figure 5A:
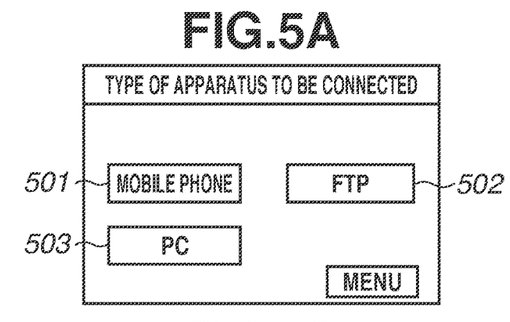
FIG. 5A illustrates an example of a screen that displays types of connection apparatuses with which the digital camera is connectable according to the first exemplary embodiment.

Next, connection processing in which the digital camera 100 connects with an AP according to the present exemplary embodiment will be described with reference to FIG. 4 and FIGS. 5A to 5G. FIG. 4 is a flowchart illustrating an example of the connection processing of the digital camera 100 according to the present exemplary embodiment. The processing of the digital camera 100 is realized when software recorded in the nonvolatile memory 103 is loaded into the work memory 104, and the control unit 101 executes the loaded software. Further, the control unit 101 loads the history information from the nonvolatile memory 103 into the work memory 104 and uses the loaded history information in the connection processing. For example, the connection processing is started when a screen displaying types of connection apparatuses as illustrated in FIG. 5A is displayed in response to user operation. The user operates the operation unit 105, such as a touch panel, to select a communication apparatus to be connected with the digital camera 100. FIGS. 5A to 5G illustrate examples of screens displayed on the display unit 106 of the digital camera 100. These diagrams will be described in detail below.

In step S400, the control unit 101 determines whether a communication apparatus to be connected has been selected by the user. In the present exemplary embodiment, if the control unit 101 determines that the communication apparatus recorded in connection apparatus information 331 has been selected (YES in step S400), the processing proceeds to step S401. If, on the other hand, the control unit 101 determines that the communication apparatus recorded in connection apparatus information 331 has not been selected (NO in step S400), the control unit 101 waits for selection of a communication apparatus to be connected by the user. An example of a method in which the user selects the communication apparatus to be connected with the digital camera 100 will be described.

Figure 5B:
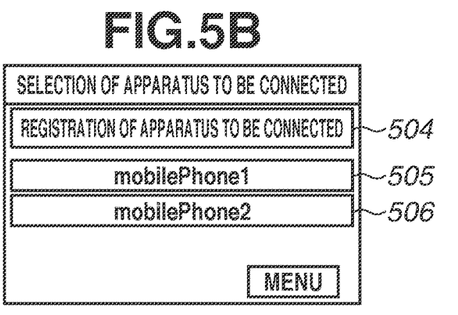
FIG. 5B illustrates an example of a screen that displays a list of communication apparatuses recorded in the digital camera according to the first exemplary embodiment.

For example, in a case where the digital camera 100 displays the screen in FIG. 5A, the user selects any one of a mobile phone 501, an FTP 502, and a PC 503 that are displayed as types of connection apparatuses by using the operation unit 105. In the present exemplary embodiment, a case where the user selects the mobile phone 501 will be described. In this case, as illustrated in FIG. 5B, the digital camera 100 displays a list of connection apparatuses on the display unit 106. In a case where the user selects an item 504 by using the operation unit 105, the control unit 101 starts processing to newly register a communication apparatus to be connected. In each of an item 505 and an item 506, a "registration name" of a communication apparatus corresponding to the apparatus type recorded in the connection apparatus information is displayed. In a case where the user selects the item 505 or the item 506 by using the operation unit 105, the control unit 101 connects with a communication apparatus recorded in the connection apparatus information corresponding to the selected "registration name". For example, in a case where the user selects the item 505 by using the operation unit 105, the control unit 101 connects with a communication apparatus recorded in the connection apparatus information 331. For example, in a case where the user selects the item 506 by using the operation unit 105, the control unit 101 connects with a communication apparatus recorded in connection apparatus information 332.

In the present exemplary embodiment, a case where the user selects the item 505 by using the operation unit 105 in step S404 will be described.

In step S401, the control unit 101 determines whether the digital camera 100 is to operate as the simple AP. For example, the control unit 101 determines whether a value has been recorded in the parameter "network formation parameter number" in the connection apparatus information. In a case where the control unit 101 determines that the digital camera 100 operates as the simple AP (YES in step S401), the processing proceeds to step S420. In a case where the control unit 101 determines that the digital camera 100 does not operate as the simple AP (NO in step S401), the processing proceeds to step S402.

Figure 5C:
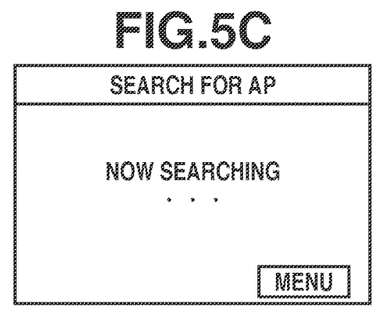
FIG. 5C illustrates an example of a screen representing that the digital camera is searching for an access point according to the first exemplary embodiment.
Figure 5D:
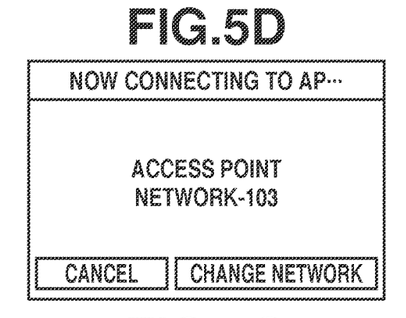
FIG. 5D illustrates an example of a screen representing that the digital camera is connecting with an access point according to the first exemplary embodiment.

In step S402, the control unit 101 searches for nearby APs. In a case where the control unit 101 starts search of APs, the control unit 101 displays a screen representing that the digital camera 100 is searching for APs, e.g., a screen as illustrated in FIG. 5C. After the control unit 101 searches for APs for a predetermined time, the processing proceeds to step S403. In the present exemplary embodiment, it is assumed that the digital camera 100 detects at least one AP in step S402.

In step S403, the control unit 101 determines whether a network formed by an AP with the stealth mode enabled is a network having the highest priority. For example, the control unit 101 determines whether the parameter "stealth mode" of the network of which the value of the parameter "connection order" recorded in the network participation parameter 310 is the largest is "YES" or "NO". In a case where the control unit 101 determines that the network formed by the AP for which the stealth mode is enabled is a network having the highest priority (YES in step S403), the processing proceeds to step S404. In a case where the control unit 101 determines that the network formed by the AP with the stealth mode enabled is not the network having the highest priority (NO in step S403), the processing proceeds to step S411. In the following, in the present exemplary embodiment, the network having the highest priority is referred to as "priority network".

First, a case where the control unit 101 determines in step S403 that the stealth mode of the AP forming the priority network is enabled will be described. In this case, a network recorded in a network participation parameter 314 is the priority network.

In step S404, the control unit 101 determines whether an AP for which the stealth mode is enabled has been detected in step S402. In a case where the control unit 101 determines that an AP for which the stealth mode is enabled has been detected (YES in step S404), the processing proceeds to step S405. In a case where the control unit 101 determines that an AP for which the stealth mode is enabled has not been detected (NO in step S404), the processing proceeds to step S411.

In step S405, the control unit 101 starts connection to the AP with the stealth mode enabled. For example, in the case where the network recorded in the network participation parameter 314 is the priority network, the control unit 101 starts connecting to the network by using parameters of the network participation parameter 314. More specifically, in this case, the control unit 101 performs communication by the communication unit 111 to establish connection with the AP that forms a network having "NETWORK-103" as an ESSID. Further, in this case, the control unit 101 displays a screen representing that the digital camera 100 is connecting with the AP, e.g., a screen illustrated in FIG. 5D, on the display unit 106.

In step S406, the control unit 101 determines whether the connection with the AP has been established. In a case where the control unit 101 determines that the connection with the AP has established (YES in step S406), the processing proceeds to step S407. In a case where the control unit 101 determines that the connection with the AP has failed (NO in step S406), the processing proceeds to step S408.

Figure 5E:
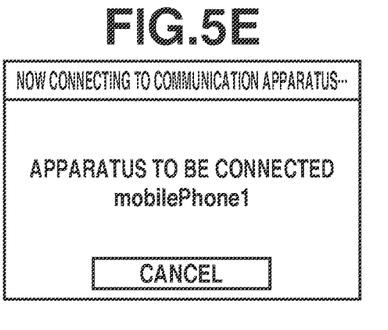
FIG. 5E illustrates an example of a screen representing that the digital camera is connecting with a communication apparatus according to the first exemplary embodiment.
Figure 5F:
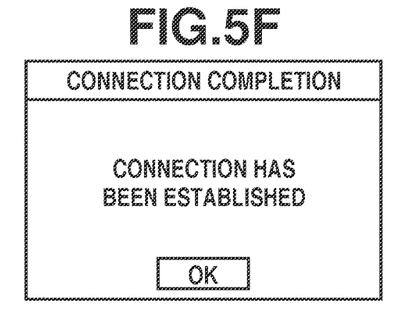
FIG. 5F illustrates an example of a screen representing that the digital camera has established connection with a communication apparatus according to the first exemplary embodiment.

In step S407, the control unit 101 establishes connection with the communication apparatus from the network formed by the AP connected in step S406, via the communication unit 111. After the connection with the communication apparatus is established, the processing in the flowchart is ended. In this step, the control unit 101 displays, on the display unit 106, a screen representing that the digital camera 100 is connecting with the communication apparatus, as illustrated in FIG. 5E, while the control unit 101 is trying to connect with the communication apparatus. In a case where the control unit 101 has established the connection with the communication apparatus, the control unit 101 displays, on the display unit 106, a screen representing that the connection with the communication apparatus has established as illustrated in FIG. 5F.

In step S408, the control unit 101 determines whether the stealth mode of the AP with which the control unit 101 has tried to connect in step S405 is enabled. In a case where the stealth mode of the AP with which the control unit 101 has tried to connect is disabled (NO in step S408), the processing proceeds to step S409. In a case where the stealth mode of the AP with which the control unit 101 has tried to connect is enabled (YES in step S408), the processing proceeds to step S410. The case where the stealth mode of the AP with which the control unit 101 has tried to connect is disabled corresponds to, for example, a case where the control unit 101 performs processing in step S412 described below, and the connection with the AP cannot be established in step S406.

In step S409, the control unit 101 performs error processing. The processing in the flowchart is then ended. The control unit 101 displays a message that notifies the user of error, e.g., "connection with AP has failed", on the display unit 106.

In step S410, the control unit 101 excludes the information on the network used in step S405 from the information on the network used in the processing of the flowchart. For example, the control unit 101 sets the value of the parameter "connection order" of the network participation parameter 314 to zero while performing the processing of the flowchart. In this case, after the processing of the flowchart is ended, the control unit 101 returns the value of the parameter "connection order" to an original value. After the processing in this step, the processing returns to the processing in step S402, and the control unit 101 searches for an AP again.

Next, a case where the control unit 101 determines in step S403 that the stealth mode of the AP forming the priority network is disabled will be described. Further, the processing is similarly applicable to a case where the control unit 101 determines that an AP for which the stealth mode is enabled has not been detected in step S404. In these cases, the processing proceeds to step S411.

In step S411, the control unit 101 determines whether the AP forming the priority network has been detected in step S402. For example, the control unit 101 determines whether the ESSID included in a packet received in step S402 coincides with an ESSID of a wired network. In a case where the control unit 101 determines that the AP forming the priority network has been detected (YES in step S411), the processing proceeds to step S412. In a case where the control unit 101 determines that the AP forming the priority network has not been detected (NO in step S411), the processing proceeds to step S413.

In step S412, the control unit 101 starts connection to the AP forming the priority network. In this step, the stealth mode is disabled in the AP with which the control unit 101 tries to connect.

In step S413, the control unit 101 determines whether the number of search times of APs has exceeded a predetermined number. For example, the control unit 101 records the number of search times of APs in the work memory 104, and determines whether the number of search times of APs has exceeded the predetermined number (e.g., ten times). For example, the number of search times the control unit 101 has searched for APs is recorded as a counter variable i in the work memory 104. In this case, at start of the processing in the flowchart, the control unit 101 sets the value of the counter variable i to zero. In a case where the control unit 101 determines that the number of search times of APs has not exceeded the predetermined number (NO in step S413), the processing proceeds to step S414. In a case where the control unit 101 determines that the number of search times of APs has exceeded the predetermined number (YES in step S413), the processing proceeds to step S415.

In step S414, the control unit 101 increments the number of search times of APs by one. For example, the control unit 101 increments the value of the counter variable i by one. After the processing in this step, the processing returns to step S402, and the control unit 101 searches for APs again.

In step S415, the control unit 101 determines whether the AP forming the network recorded in the nonvolatile memory 103 has been detected as a result of search of APs in step S402. For example, the control unit 101 determines whether the AP forming the network recorded in the network participation parameter 310 has been detected. In this case, the control unit 101 determines whether the ESSID included in the packet received in step S402 is included in the ESSIDs of the networks recorded in the network participation parameter 310. In a case where the control unit 101 determines that the AP forming the network recorded in the nonvolatile memory 103 has been detected (YES in step S415), the processing proceeds to step S416. In a case where the control unit 101 determines that the AP forming the network recorded in the nonvolatile memory 103 has not been detected (NO in step S415), the processing proceeds to step S417.

In step S416, the control unit 101 starts connection to an AP that forms the network having the highest priority, among the detected APs. For example, the control unit 101 starts connection to an AP that forms a network having the largest value of the parameter "connection order" among the pieces of information on the networks recorded in the network participation parameter 310. After performing the processing in this step, the control unit 101 performs the processing in step S406.

Figure 5G:
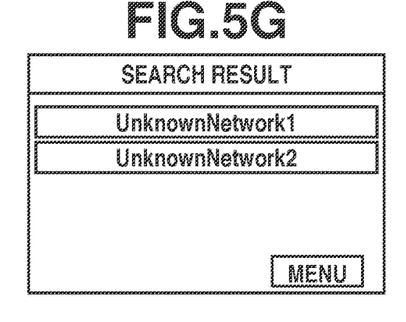
FIG. 5G illustrates an example of a screen that displays a search result of access points searched by the digital camera according to the first exemplary embodiment.

In step S417, the control unit 101 displays a search result of APs in step S402. For example, the control unit 101 displays a screen indicating the search result of APs as illustrated in FIG. 5G.

In step S418, the control unit 101 determines whether an AP to be connected has been instructed by the user. For example, in a case where the user performs a touch operation on a portion of the touch panel where the ESSID of the network formed by a certain AP is displayed on the display unit 106, the control unit 101 determines that the AP to be connected has been instructed by the user (YES in step S418), and the processing proceeds to step S419. In a case where the control unit 101 determines that an AP to be connected has not been instructed by the user (NO in step S418), the control unit 101 waits for instruction of the AP to be connected by the user. In a case where the control unit 101 determines that a parameter such as a password is necessary, the control unit 101 requests the user to input the parameter in this step.

In step S419, the control unit 101 starts connection to the AP instructed to be connected by the user in step S418. After performing the processing in this step, the control unit 101 performs the processing in step S406.

A case where the control unit 101 determines in step S401 that the digital camera 100 operates as the simple AP will be described. For example, a case where the user selects the item 506 by using the operation unit 105 in step S400 is described. In this case, the processing proceeds to step S420.

In step S420, the control unit 101 controls the communication unit 111 to form a network as the simple AP. At this time, the control unit 101 refers to a network formation parameter that has the "management number" of the network formation parameter 320 corresponding to a value recorded in the parameter "network formation parameter number" of the connection apparatus information 332. In the present exemplary embodiment, the control unit 101 forms a network by using information recorded in a network formation parameter 321. After the processing in this step, the processing proceeds to step S407, and the control unit 101 establishes connection with the communication apparatus.

The connection processing of the digital camera 100 has been described above. The digital camera 100 can efficiently connect with the access point for which the stealth mode is enabled by the connection processing. Further, the digital camera 100 can also efficiently connect with the AP where the stealth mode is disabled.

For example, in a case where a "MENU" button is selected by the user on the screen in FIG. 5A, the processing of the flowchart is ended. The processing of the flowcharts is ended also in a case where a "MENU" button is selected on any of the screens in FIGS. 5B, 5C, and 5G.

As the parameter "connection order" recorded in the network participation parameter 310, a date and time when the control unit 101 establishes the network last time may be recorded. In this case, the control unit 101 determines that, as the date and time recorded in the parameter "connection order" of the network is newer, the AP forming the network has the higher priority for establishment of the connection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-214507, filed Nov. 27, 2019, which is hereby incorporated by reference herein in its entirety.

What is claimed is:

1. A communication apparatus comprising:
a wireless communication unit;
a recording unit; and
a control unit,
wherein, in a case where connection with a relay apparatus is established by the wireless communication unit, the control unit controls the recording unit to record information on a network formed by the relay apparatus and information on whether a stealth mode is enabled for the network, as history information, and wherein, in a case where a beacon, which does not include a service set identifier of a network, is received by the wireless communication unit in a state where the history information includes information on a network for which the stealth mode is enabled, which was recorded due to a connection with the network in the past, the control unit controls the wireless communication unit to start wireless connection to the relay apparatus that forms the network, which is recorded in the history information, for which the stealth mode is enabled, wherein in a case where the beacon, which does not include a service set identifier of a network, is not received by the wireless communication unit in a state where the history information includes information on a network for which the stealth mode is enabled, which was recorded due to a connection with the network in the past, the control unit does not control the wireless communication unit to start wireless connection to the relay apparatus that forms the network, which is recorded in the history information, for which the stealth mode is enabled, wherein the control unit is implemented by one or more processors.

2. The communication apparatus according to claim 1, wherein, in a case where wireless connection with another communication apparatus is to be established, the control unit is configured to control the wireless communication unit to receive a beacon from a relay apparatus.

3. The communication apparatus according to claim 1, wherein the history information further includes a parameter representing priority levels for networks, wherein the control unit is configured to control the wireless communication unit to start wireless connection to a relay apparatus that forms the network for which the parameter represents the highest priority.

4. The communication apparatus according to claim 3, wherein, in a case where the stealth mode is enabled for a network for which the parameter represents the highest priority, the control unit is configured to control the wireless communication unit to start wireless connection to the relay apparatus that forms the network, for which the parameter represents the highest priority, in response to receive a beacon that does not include a service set identifier of a network, and wherein, in a case where the stealth mode is disabled for the network for which the parameter represents the highest priority, the control unit is configured to control the wireless communication unit to start wireless connection to the relay apparatus that forms network, for which the parameter represents the highest priority.

5. The communication apparatus according to claim 3, wherein, in a case where connection with a relay apparatus is established by the wireless communication unit, the control unit is configured to record the parameter included in history information on the network formed by the relay apparatus connected with the communication apparatus, so as to represent a higher priority than that represented by the parameter included in history information on another network.

6. The communication apparatus according to claim 3, wherein, in a case where it is determined that a received beacon does not include the service set identifier of the network for which the parameter represents the highest priority, the control unit is configured to control the wireless communication unit to receive a beacon again.

7. The communication apparatus according to claim 6, wherein, in a case where the control unit controls the wireless communication unit to receive a beacon more than a predetermined number of times, the control unit is configured to control, based on service set identifiers of networks included in the received beacon, the wireless communication unit to establish wireless connection with the relay apparatus that forms the network for which the parameter represents the highest priority.

8. The communication apparatus according to claim 6, further comprising a display unit, wherein, in a case where the control unit controls the wireless communication unit to receive a beacon more than a predetermined number of times, the control unit is configured to control the display unit to display a list of service set identifiers of networks included in the received beacon.

9. The communication apparatus according to claim 3, wherein, in a case where establishment of the wireless connection with the relay apparatus forming the network for which the stealth mode is enabled and for which the parameter represents the highest priority, has failed, the control unit is configured to exclude the network for which the parameter represents the highest priority, and control the wireless communication unit to establish wireless connection with a relay apparatus again.

10. The communication apparatus according to claim 3, wherein the parameter is a date and time when the control unit established wireless connection with a relay apparatus, wherein the control unit is configured to determine that, as the date and time is newer, the network formed by the relay apparatus has the higher priority.

11. The communication apparatus according to claim 10, wherein, in a case where establishment of wireless connection with a relay apparatus for which the stealth mode is disabled has failed, the control unit is configured to perform error processing for notifying a user of an error.

12. The communication apparatus according to claim 1, further comprising an imaging unit, wherein the control unit is configured to establish connection with another communication apparatus via a relay apparatus with which the wireless connection is established, and wherein the control unit is configured to control the wireless communication unit to transmit image data captured by the imaging unit to the other communication apparatus with which the wireless connection is established via the relay apparatus connected with the communication apparatus.

13. The communication apparatus according to claim 1, wherein the service set identifier of a network is an extended service set identifier (ESSID).

14. A method for controlling a communication apparatus, the communication apparatus including a wireless communication unit and a recording unit, the method comprising:

controlling, in a case where connection with a relay apparatus is established by the wireless communication unit, the recording unit to record information on a network formed by the relay apparatus and information on whether a stealth mode is enabled for the network, as history information; and controlling, in a case where a beacon, which does not include a service set identifier of a network is received by the wireless communication unit in a state where the history information includes information on a network for which the stealth mode is enabled, which was recorded due to a connection with the network in the past, the wireless communication unit to start wireless connection to the relay apparatus that forms the network, which is recorded in the history information, for which the stealth mode is enabled, and not controlling, in a case where the beacon, which does not include a service set identifier of a network, is not received by the wireless communication unit in a state where the history information includes information on a network for which the stealth mode is enabled, which was recorded due to a connection with the network in the past, the wireless communication unit to start wireless connection to the relay apparatus that forms the network, which is recorded in the history information, for which the stealth mode is enabled.

15. A non-transitory computer-readable medium storing a program for causing a computer to execute a method for controlling a communication apparatus, the communication apparatus including a wireless communication unit and a recording unit, the method comprising:

controlling, in a case where connection with a relay apparatus is established by the wireless communication unit, the recording unit to record information on a network formed by the relay apparatus and information on whether a stealth mode is enabled for the network, as history information; and controlling, in a case where a beacon, which does not include a service set identifier of a network is received by the wireless communication unit in a state where the history information includes information on a network for which the stealth mode is enabled, which was recorded due to a connection with the network in the past, the wireless communication unit to start wireless connection to the relay apparatus that forms the network, which is recorded in the history information for which the stealth mode is enabled, and not controlling, in a case where the beacon, which does not include a service set identifier of a network, is not received by the wireless communication unit in a state where the history information includes information on a network for which the stealth mode is enabled, which was recorded due to a connection with the network in the past, the wireless communication unit to start wireless connection to the relay apparatus that forms the network, which is recorded in the history information, for which the stealth mode is enabled.

* * * * *